(12) United States Patent
Blackwell et al.

(10) Patent No.: US 10,006,406 B2
(45) Date of Patent: Jun. 26, 2018

(54) GAS TURBINE ENGINE VARIABLE AREA FAN NOZZLE CONTROL

(71) Applicant: United Technologies Corporation, Hartford, CT (US)

(72) Inventors: Geoffrey T. Blackwell, Vernon, CT (US); William J. McVey, Granby, CT (US); William G. Tempelman, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 622 days.

(21) Appl. No.: 14/502,354

(22) Filed: Sep. 30, 2014

(65) Prior Publication Data

US 2015/0315976 A1 Nov. 5, 2015

Related U.S. Application Data

(63) Continuation of application No. 13/365,455, filed on Feb. 3, 2012, now Pat. No. 8,869,508.

(Continued)

(51) Int. Cl.
*F02K 3/06* (2006.01)
*F02C 9/16* (2006.01)
(Continued)

(52) U.S. Cl.
CPC ................ *F02K 3/06* (2013.01); *F02C 3/107* (2013.01); *F02C 9/16* (2013.01); *F02C 9/18* (2013.01);
(Continued)

(58) Field of Classification Search
CPC . F02K 1/06; F02K 1/09; F02K 1/1207; F02K 1/12; F02K 1/15; F02K 1/18; F02K 3/06; F02K 3/075; F05D 2270/304
See application file for complete search history.

(56) References Cited

U.S. PATENT DOCUMENTS

| 2,469,375 A | 5/1949 | Flagle |
| 2,663,993 A | 12/1953 | Mosser |

(Continued)

FOREIGN PATENT DOCUMENTS

| EP | 0848152 A2 | 6/1998 |
| GB | 579657 A | 7/1943 |

(Continued)

OTHER PUBLICATIONS

International Preliminary Report on Patentability for PCT Application No. PCT/US13/022467, dated Aug. 5, 2014.

(Continued)

*Primary Examiner* — Andrew Nguyen
(74) *Attorney, Agent, or Firm* — Carlson, Gaskey & Olds, P.C.

(57) ABSTRACT

A method of managing a gas turbine engine includes the steps of detecting an airspeed and detecting a fan speed. A parameter relationship is referenced related to a desired variable area fan nozzle position based upon at least airspeed and fan speed. The detected airspeed and detected fan speed is compared to the parameter relationship to determine a target variable area fan nozzle position. An actual variable area fan nozzle position is adjusted in response to the determination of the target area fan nozzle position and at least one threshold.

16 Claims, 2 Drawing Sheets

Related U.S. Application Data

(60) Provisional application No. 61/592,984, filed on Jan. 31, 2012.

(51) Int. Cl.
*F02K 1/06* (2006.01)
*F02K 1/09* (2006.01)
*F02K 1/18* (2006.01)
*F02C 3/107* (2006.01)
*F02C 9/18* (2006.01)
*F02C 9/28* (2006.01)

(52) U.S. Cl.
CPC .............. *F02C 9/28* (2013.01); *F02K 1/06* (2013.01); *F02K 1/09* (2013.01); *F02K 1/18* (2013.01); *F05D 2220/32* (2013.01); *F05D 2270/101* (2013.01); *F05D 2270/304* (2013.01); *F05D 2270/3061* (2013.01)

(56) References Cited

U.S. PATENT DOCUMENTS

| | | | |
|---|---|---|---|
| 3,287,906 A | 11/1966 | McCormick | |
| 3,295,316 A * | 1/1967 | Beatrice | F02C 7/26 60/39.281 |
| 3,622,075 A | 11/1971 | Harris | |
| 3,754,484 A | 8/1973 | Roberts | |
| 3,892,358 A | 7/1975 | Gisslen | |
| 3,932,058 A | 1/1976 | Harner et al. | |
| 3,988,889 A * | 11/1976 | Chamay | F02K 1/1207 239/265.39 |
| 4,068,469 A | 1/1978 | Adamson | |
| 4,130,872 A * | 12/1978 | Haloff | F02C 9/16 60/794 |
| 4,159,625 A | 7/1979 | Kerr | |
| 4,242,864 A * | 1/1981 | Cornett | F02K 1/17 60/226.1 |
| 4,397,431 A | 8/1983 | Ben-Porat | |
| 5,005,015 A | 4/1991 | Dehn et al. | |
| 5,257,498 A | 11/1993 | Nikkanen et al. | |
| 5,261,227 A * | 11/1993 | Giffin, III | F01D 17/162 60/226.1 |
| 5,282,719 A | 2/1994 | McCarty et al. | |
| 5,433,674 A | 7/1995 | Sheridan et al. | |
| 5,447,411 A | 9/1995 | Curley et al. | |
| 5,524,847 A | 6/1996 | Brodell et al. | |
| 5,778,659 A | 7/1998 | Duesler et al. | |
| 5,853,148 A * | 12/1998 | Standish | F02K 1/72 239/265.29 |
| 5,857,836 A | 1/1999 | Stickler et al. | |
| 5,915,917 A | 6/1999 | Eveker et al. | |
| 5,975,841 A | 11/1999 | Lindemuth et al. | |
| 6,223,616 B1 | 5/2001 | Sheridan | |
| 6,318,070 B1 | 11/2001 | Rey et al. | |
| 6,814,541 B2 | 11/2004 | Evans et al. | |
| 6,892,127 B2 * | 5/2005 | Wiseman | G05B 23/0218 60/233 |
| 7,021,042 B2 | 4/2006 | Law | |
| 7,174,704 B2 * | 2/2007 | Renggli | F02K 1/09 239/265.33 |
| 7,175,136 B2 | 2/2007 | Shah et al. | |
| 7,469,862 B2 | 12/2008 | Layland et al. | |
| 7,591,754 B2 | 9/2009 | Duong et al. | |
| 7,631,483 B2 | 12/2009 | Mani et al. | |
| 7,694,505 B2 | 4/2010 | Schilling | |
| 7,837,150 B2 | 4/2010 | Zecca et al. | |
| 7,762,081 B2 | 7/2010 | Williams | |
| 7,780,117 B2 | 8/2010 | Bolura et al. | |
| 7,824,305 B2 | 11/2010 | Duong et al. | |
| 7,926,260 B2 | 4/2011 | Sheridan et al. | |
| 8,205,432 B2 | 6/2012 | Sheridan | |
| 2004/0102890 A1 | 5/2004 | Brunell | |
| 2005/0060982 A1 | 3/2005 | Mani et al. | |
| 2006/0179818 A1 * | 8/2006 | Merchant | F02K 3/04 60/226.1 |
| 2008/0257033 A1 | 10/2008 | Roberts | |
| 2009/0025937 A1 | 1/2009 | Robinson et al. | |
| 2009/0067993 A1 | 3/2009 | Roberge et al. | |
| 2009/0120099 A1 | 5/2009 | Brand et al. | |
| 2009/0260345 A1 | 10/2009 | Chaudhry | |
| 2009/0277155 A1 | 11/2009 | Bulin et al. | |
| 2009/0293449 A1 * | 12/2009 | Venter | F02C 9/18 60/226.1 |
| 2009/0294593 A1 | 12/2009 | Jaquet-Francillon et al. | |
| 2010/0011740 A1 * | 1/2010 | McVey | F02K 1/1207 60/204 |
| 2010/0043390 A1 | 2/2010 | Jain et al. | |
| 2010/0068039 A1 | 3/2010 | Winter | |
| 2010/0148396 A1 | 6/2010 | Xie et al. | |
| 2010/0150700 A1 | 6/2010 | Strecker et al. | |
| 2010/0218483 A1 | 9/2010 | Smith | |
| 2010/0229528 A1 | 9/2010 | Ramiaoui et al. | |
| 2010/0331139 A1 | 12/2010 | McCune | |
| 2011/0004388 A1 | 1/2011 | Winter | |
| 2011/0052370 A1 | 3/2011 | Karpman | |
| 2011/0120081 A1 * | 5/2011 | Schwark, Jr. | F02K 1/09 60/226.3 |
| 2013/0192247 A1 | 8/2013 | Blackwell et al. | |

FOREIGN PATENT DOCUMENTS

| | | |
|---|---|---|
| GB | 1386481 A | 3/1975 |
| GB | 1516041 | 6/1978 |
| GB | 2041090 | 9/1980 |
| WO | 2007038674 | 4/2007 |
| WO | 2008045079 A1 | 4/2008 |

OTHER PUBLICATIONS

PCT International Search Report and Written Opinion dated Feb. 12, 2013, PCT Application No. PCT/US13/22467.

Gunston, Bill, "Jane's Aero-Engines," Issue Seven, 2000, pp. 510-512.

Extended European Search Report for European Application No. 13775374.5 dated Sep. 18, 2015.

Singapore Search Report and Written Opinion for Singapore Application No. 11201402942Q dated Apr. 6, 2015.

International Preliminary Report on Patentability for PCT/US2013/022476, dated Aug. 5, 2014.

Walsh, Phillip. Gas Turbine Performance. Blackwell Publishing. 2004. p. 364.

International Search Report and Written Opinion for PCT/US13/22476 dated Mar. 4, 2015.

NASA Conference Publication. Quiet, powered-lift propulsion. Cleveland, Ohio. Nov. 14-15, 1978.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8), p. 32.

Hendricks, E.S. and Tong, M.T. (2012). Performance and weight estimates for an advanced open rotor engine. NASA/TM-2012-217710.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.

Zalud, T. (1998). Gears put a new spin on turbofan performance. Machine Design, 70(20), p. 104.

Singapore Search Report for Singapore Patent Application No. 11201402941S dated Jul. 31, 2015.

Extended European Search Report for European Application No. 13743391.8 dated Nov. 9, 2015.

Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida.

(56) References Cited

OTHER PUBLICATIONS

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K., Gu, C. and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.

Dickey, T.A. and Dobak, E.R. (1972). The evolution and development status of ALF 502 turbofan engine. National Aerospace Engineering and Manufacturing Meeting. San Diego, California. Oct. 2-5, 1972.

Gunston, B. (Ed.) (2000). Jane's aero-engines, Issue seven. Coulsdon, Surrey, UK: Jane's Information Group Limited.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

* cited by examiner

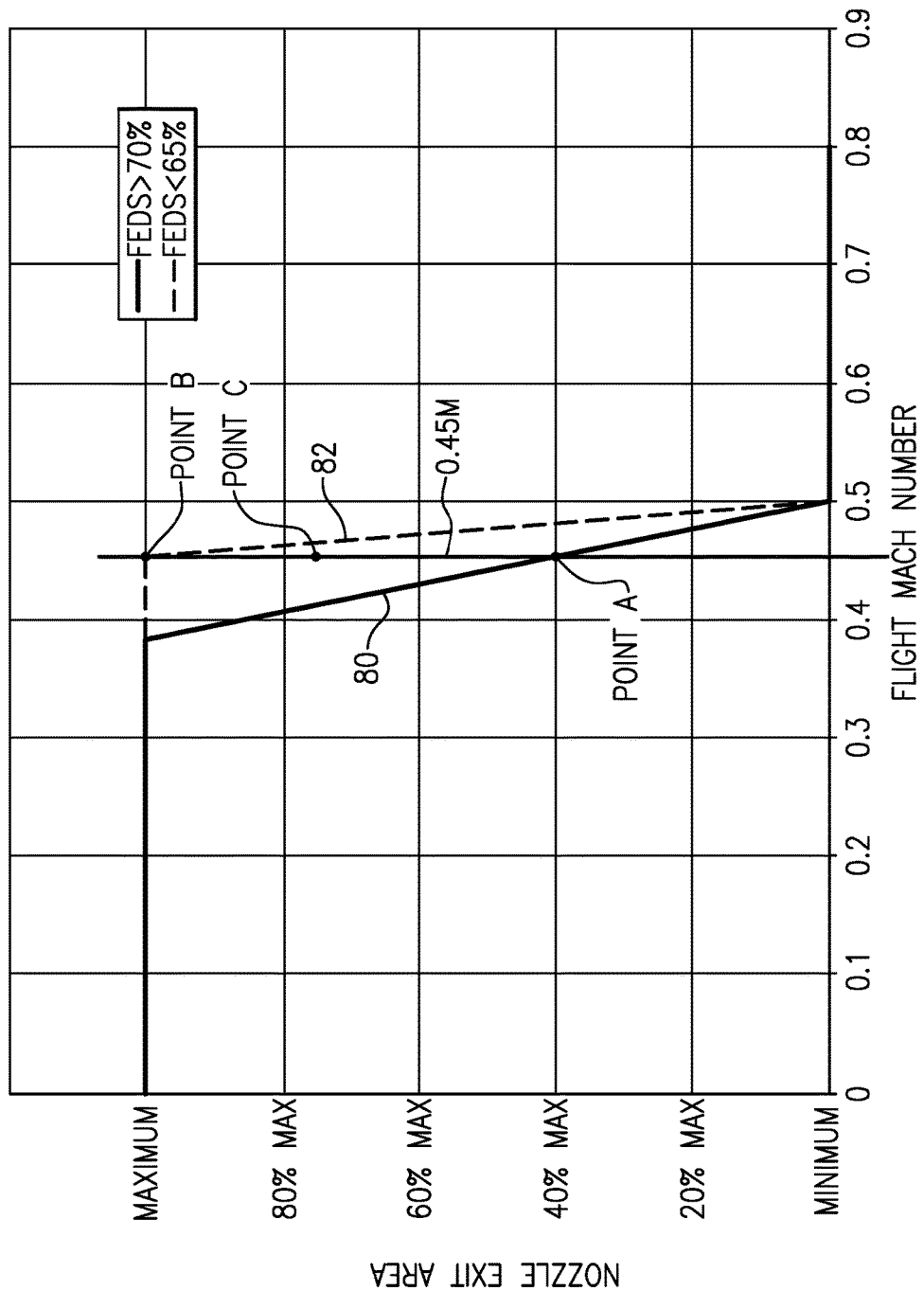

GAS TURBINE ENGINE VARIABLE AREA FAN NOZZLE CONTROL

This application is a continuation of U.S. Ser. No. 13/365,455, which was filed on Feb. 3, 2012 which claims priority to U.S. Provisional Application No. 61/592,984, which was filed on Jan. 31, 2012.

BACKGROUND

This disclosure relates to managing gas turbine engine fan operability and operating characteristics using a variable area fan nozzle.

One typical gas turbine engine includes low and high speed spools housed within a core nacelle. The low speed spool supports a low pressure compressor and turbine, and the high speed spool supports a high pressure compressor and turbine. A fan is coupled to the low speed spool. A fan nacelle surrounds the fan and core nacelle to provide a bypass flow path having a nozzle. Typically, the nozzle is a fixed structure providing a fixed nozzle exit area.

The fan's operating line must be controlled to avoid undesired conditions such as fan flutter, surge or stall. The fan operating line can be manipulated during engine operation to ensure that the fan operability margin is sufficient. The fan operating line is defined, for example, by characteristics including low spool speed, bypass airflow and turbofan pressure ratio. Manipulating any one of these characteristics can change the fan operating line to meet the desired fan operability margin to avoid undesired conditions.

The engine is designed to meet the fan operability line and optimize the overall engine performance throughout the flight envelope. As a result, the engine design is compromised to accommodate various engine operating conditions that may occur during the flight envelope. For example, fuel consumption for some engine operating conditions may be less than desired in order to maintain the fan operating line with an adequate margin for all engine operating conditions. For example, fan operating characteristics are compromised, to varying degrees, from high Mach number flight conditions to ground idle conditions for fixed nozzle area turbofan engines. This creates design challenges and/or performance penalties to manage the operability requirements.

SUMMARY

In one exemplary embodiment, a method of managing a gas turbine engine includes the steps of detecting an airspeed and detecting a fan speed. A parameter relationship is referenced related to a desired variable area fan nozzle position based upon at least airspeed and fan speed. The detected airspeed and detected fan speed is compared to the parameter relationship to determine a target variable area fan nozzle position. An actual variable area fan nozzle position is adjusted in response to the determination of the target area fan nozzle position and at least one threshold.

In a further embodiment of any of the above, the fan speed detecting step includes detecting a low speed spool rotational speed and correcting the fan speed based upon an ambient temperature.

In a further embodiment of any of the above, the fan speed detecting step includes calculating the fan speed based upon a gear reduction ratio.

In a further embodiment of any of the above, the referencing and comparing steps include providing a target variable area fan nozzle position for a range of air speeds based upon the fan speed.

In a further embodiment of any of the above, the air speed range is 0.35-0.55 Mach. The data table includes first and second thresholds corresponding to lower and upper fan speed limits. The target variable area fan nozzle position is selected based upon the first and second thresholds.

In a further embodiment of any of the above, the upper fan speed limit is 60% of an aerodynamic design speed of the fan, and the lower fan speed limit is 75% of the aerodynamic design speed of the fan.

In a further embodiment of any of the above, the upper fan speed limit is 65% of the aerodynamic design speed of the fan.

In a further embodiment of any of the above, the lower fan speed limit is 75% of the aerodynamic design speed of the fan.

In a further embodiment of any of the above, the adjusting step includes adjusting the target variable fan nozzle position to provide an exit area of a fan nacelle.

In a further embodiment of any of the above, the adjusting step includes translating the flaps to selectively block a vent in the fan nacelle.

In a further embodiment of any of the above, the gas turbine engine includes a fan arranged in a fan nacelle having a flap configured to be movable between first and second positions. An actuator is operatively coupled to the flap. A compressor section is fluidly connected to the fan, and the compressor includes a high pressure compressor and a low pressure compressor. A combustor is fluidly connected to the compressor section, and a turbine section is fluidly connected to the combustor. The turbine section includes a high pressure turbine coupled to the high pressure compressor via a shaft, and a low pressure turbine.

In a further embodiment of any of the above, the gas turbine engine is a geared aircraft engine having a bypass ratio of greater than about six (6).

In a further embodiment of any of the above, the gas turbine engine includes a low Fan Pressure Ratio of less than about 1.45.

In a further embodiment of any of the above, the low pressure turbine has a pressure ratio that is greater than about 5.

In another exemplary embodiment, a gas turbine engine includes a fan nacelle that includes a flap that is configured to be movable between first and second positions. An actuator is operatively coupled to the flap. A controller is configured to reference a parameter relationship that relates to a desired variable area fan nozzle position based upon at least airspeed and fan speed. The controller is configured to compare a detected airspeed and a detected fan speed to the parameter relationship to determine a target variable area fan nozzle position. The controller is configured to provide a command to the actuator to adjust the flap from a first position to the second position in response to the determination of the target variable fan nozzle position and at least one threshold.

In a further embodiment of any of the above, a fan is arranged in the fan nacelle. A compressor section is fluidly connected to the fan, and the compressor includes a high pressure compressor and a low pressure compressor. A combustor is fluidly connected to the compressor section, and a turbine section is fluidly connected to the combustor. The turbine section includes a high pressure turbine coupled to the high pressure compressor via a shaft, and a low pressure turbine.

In a further embodiment of any of the above, the gas turbine engine is a geared aircraft engine having a bypass ratio of greater than about six (6).

In a further embodiment of any of the above, the gas turbine engine includes a low Fan Pressure Ratio of less than about 1.45.

In a further embodiment of any of the above, the low pressure turbine has a pressure ratio that is greater than about 5.

In a further embodiment of any of the above, the controller is configured to provide a target variable area fan nozzle position for a range of air speeds based upon the fan speed. The air speed range is 0.35-0.55 Mach. The data table includes first and second thresholds that correspond to lower and upper fan speed limits. The target variable area fan nozzle position is selected based upon the first and second thresholds.

BRIEF DESCRIPTION OF THE DRAWINGS

The disclosure can be further understood by reference to the following detailed description when considered in connection with the accompanying drawings wherein:

FIG. 2 is an example schedule for varying a fan nacelle exit area based upon air speed and fan speed.

DETAILED DESCRIPTION

Figure 1:
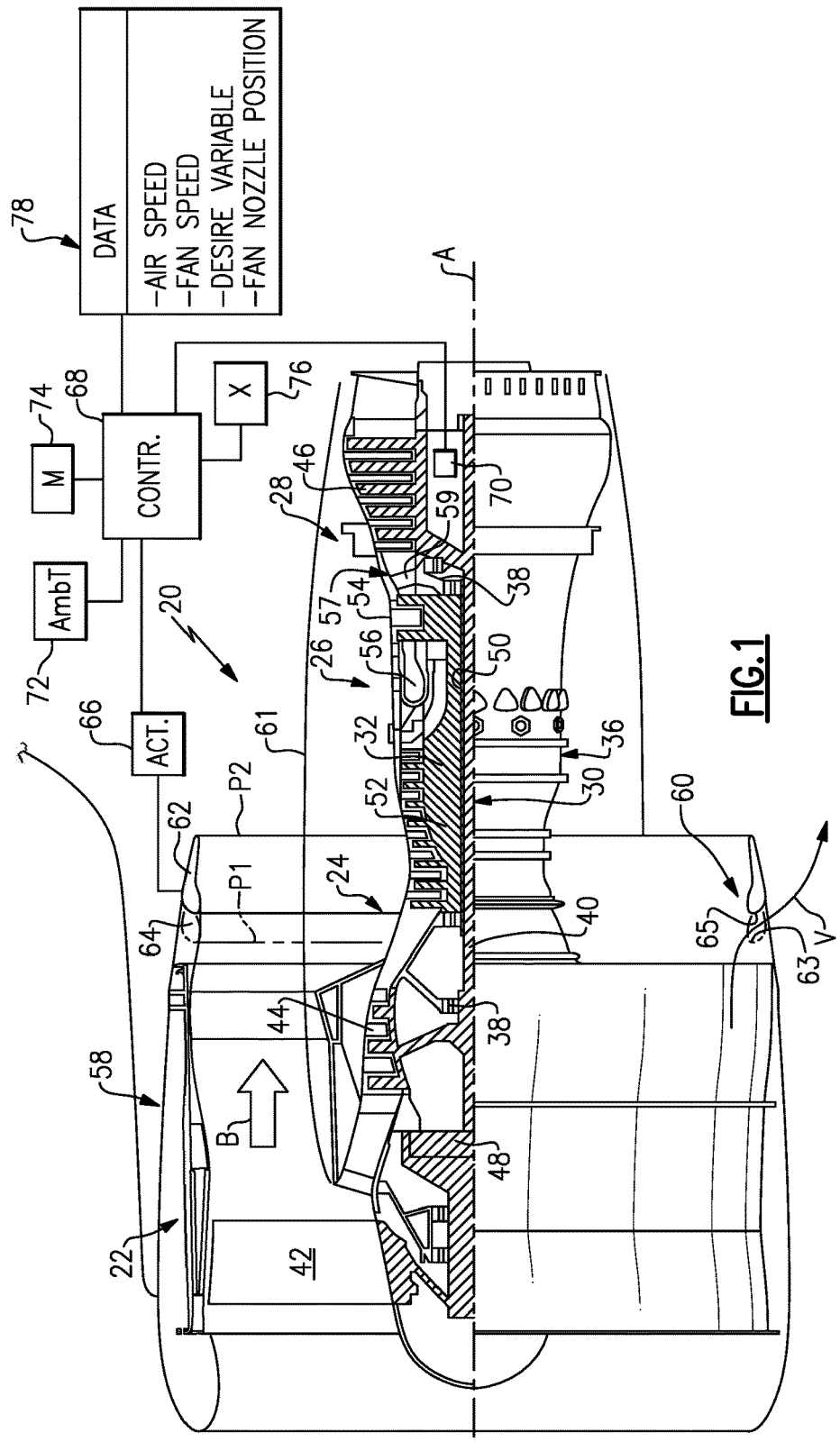
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and, for example, greater than about 2.5:1 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm per hour of fuel being burned divided by lbf of thrust the engine produces at that minimum point. "Low fan pressure ratio" is the pressure ratio across the fan blade alone, regardless of the presence of a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed," as disclosed herein according to one non-limiting embodiment, is less than about 1150 ft/second.

A core nacelle 61 surrounds the engine static structure 36. A fan nacelle 58 surrounds the core nacelle 61 to provide the bypass flow path. In the example engine 20, a nozzle exit area 60 is effectively variable to alter the bypass flow B and achieve a desired target operability line. In one example, the fan nacelle 58 includes moveable flaps 62 near the bypass flowpath exit, which may be provided by arcuate segments that are generally linearly translatable parallel to the axis A in response to inputs by one or more actuators 66.

The flaps 62 are moveable between first and second positions P1, P2 and positions in between. The flaps 62 selectively regulate by blocking, a size of an annular vent 64 provided between a trailing end 63 of the nacelle body and a leading edge 65 of the flaps 62. The vent 64 is fully open in the second position P2, in which a vent flow V from the bypass flowpath is permitted to exit through the vent 64. An open vent 64 increases the bypass flow B and effectively increases the nozzle exit area 60. With the flaps 62 in the first position P1, flow from the bypass flowpath is not permitted to pass through the vent 64, which is blocked by the flaps 62.

A controller 68 is in communication with a low speed spool sensor 70, which detects a rotational speed of the low speed spool 30. A temperature sensor 72 detects the ambient temperature. Air speed 74 is provided to the controller 68, as is the ambient temperature. In the example, the controller 68 may store various parameters 76 relating to the engine 20, such as a gear reduction ratio of the geared architecture 48, outer diameter of the fan 22 and other information useful in calculating a low corrected fan tip speed.

A parameter relationship 78, which may be one or more data tables and/or equations and/or input-output data chart etc., for example, may be stored in the controller 68. The parameter relationship 78 includes information relating to air speed, fan speed and a desired variable area fan nozzle position, which provide a schedule illustrated in FIG. 2. One example of the parameter relationship 78 is a bivarient lookup table. In operation, the turbofan engine operating line is managed by detecting the air speed and the fan speed, for example, by determining the low speed spool rotational speed. In should be understood, however, that the fan speed may be inferred from the low speed spool rotational speed rather than calculated. That is, only the low speed spool rotational speed could be monitored and compared to a reference low speed spool rotational speed in the parameter relationship 78, rather than a fan speed. The controller 68 references the parameter relationship 78, which includes a desired variable area fan nozzle position relative to the air speed and fan speed. The detected air speed and fan speed, which may be detected in any order, are compared to the data table to provide a target variable area fan nozzle position. The controller 68 commands the actuators 66 to adjust the flaps 62 from an actual variable area fan nozzle position, or the current flap position, to the target variable area fan nozzle position.

One example schedule is illustrated in FIG. 2. Multiple data curves are provided, which correspond to different fan speeds. The curves, which are linear in one example, provide first and second thresholds 80, 82 that respectively relate to upper and lower limits for the target variable area fan nozzle position as it relates to a range of air speeds. As shown in the example in FIG. 2, air speeds of between about 0.35 Mach and 0.55 Mach, and in one example, between about 0.38 Mach and 0.50 Mach, provide a region in which the nozzle exit area is adjusted based upon fan speed. Below 0.35 Mach and above 0.55 Mach, the nozzle exit area is respectively at its maximum and minimum and the fan speed need not be used to determine the target variable area fan nozzle position. For air speeds between 0.35 Mach and 0.55 Mach, the fan speed is used to determine a target variable area fan nozzle position.

In FIG. 2, the percent speed value represents the engine operating fan speed relative to the fan aerodynamic design speed (FEDS). In one example, the upper limit is defined at 60% of the FEDS, and the lower limit is defined at 75% of the FEDS. In another example, the upper and lower limits are defined respectively 65% and 70% of a particular fan speed. In the example of 0.45 Mach shown in FIG. 2, if the detected fan speed is above 70% of a particular fan speed, the target variable area fan nozzle position will be 40% of the maximum open position (point A). If the detected fan speed is less than 65% of a particular fan speed, the target variable area fan nozzle position will be at the maximum open position (point B in FIG. 2, second position P2 in FIG. 1). For fan speeds between the lower and upper thresholds 80, 82, the target variable area fan nozzle positions are averaged, for example. So, for a fan speed of 67% of a particular fan speed, the target variable area fan nozzle position is 75% of the maximum open position (point C). In this manner, the fan speed, or low speed spool rotational speed, is used to determine the target variable area fan nozzle position at a particular range of air speed.

The controller 68 can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 68 may be a hardware device for executing software, particularly software stored in memory. The controller 68 can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

The controller 68 can be configured to execute software stored within the memory, to communicate data to and from the memory, and to generally control operations of the computing device pursuant to the software. Software in memory, in whole or in part, is read by the processor, perhaps buffered within the processor, and then executed.

Although an example embodiment has been disclosed, a worker of ordinary skill in this art would recognize that certain modifications would come within the scope of the claims. For that reason, the following claims should be studied to determine their true scope and content.

What is claimed is:

1. A method of managing a gas turbine engine comprising the steps of:

detecting an airspeed;

detecting a fan speed;

referencing a parameter relationship related to a desired variable area fan nozzle position based upon at least airspeed and fan speed, the parameter relationship includes at least one of first and second thresholds respectively corresponding to upper and lower fan speed limits that provide a schedule of curves of the fan speed in relation to a fan aerodynamic design speed, wherein the upper and lower fan speed limits are less than the fan aerodynamic design speed, and comparing the detected airspeed and detected fan speed to the parameter relationship to determine a target variable area fan nozzle position according to the schedule of curves; and adjusting an actual variable area fan nozzle position to the target variable area fan nozzle position.

2. The method according to claim 1, wherein the fan speed detecting step includes detecting a low speed spool rotational speed, and correcting the fan speed based upon an ambient temperature.

3. The method according to claim 2, wherein the fan speed detecting step includes calculating the fan speed based upon a gear reduction ratio.

4. The method according to claim 1, wherein the referencing and comparing steps include providing the target variable area fan nozzle position for a range of air speeds based upon the fan speed.

5. The method according to claim 4, wherein the air speed range is 0.35-0.55 Mach, and a data table includes the first and second thresholds.

6. The method according to claim 5, wherein the lower fan speed limit is 60% of the fan aerodynamic design speed, and the upper fan speed limit is 75% of the fan aerodynamic design speed.

7. The method according to claim 5, wherein the lower fan speed limit is 65% of the fan aerodynamic design speed.

8. The method according to claim 5, wherein the upper fan speed limit is 75% of the fan aerodynamic design speed.

9. The method according to claim 1, wherein the adjusting step includes adjusting the target variable fan nozzle position to provide an exit area of a fan nacelle.

10. The method according to claim 9, wherein the adjusting step includes translating flaps to selectively block a vent in the fan nacelle.

11. The method according to claim 1, wherein the gas turbine engine comprises:

a fan arranged in a fan nacelle including a flap configured to be movable between first and second positions;

an actuator operatively coupled to the flap;

a compressor section fluidly connected to the fan, the compressor comprising a high pressure compressor and a low pressure compressor;

a combustor fluidly connected to the compressor section;

a turbine section fluidly connected to the combustor, the turbine section comprising:

a high pressure turbine coupled to the high pressure compressor via a shaft; and a low pressure turbine.

12. The method according to claim 11, wherein the gas turbine engine includes a low Fan Pressure Ratio of less than about 1.45.

13. A gas turbine engine comprising:

fan nacelle including a flap configured to be movable between first and second positions;

an actuator operatively coupled to the flap; and a controller configured to reference a parameter relationship that relates to a desired variable area fan nozzle position based upon at least airspeed and fan speed, the controller configured to compare a detected airspeed and a detected fan speed to the parameter relationship to determine a target variable area fan nozzle position, the parameter relationship includes at least one of first and second thresholds respectively corresponding to lower and upper fan speed limits that provide a schedule of curves of the fan speed in relation to a fan aerodynamic design speed, wherein the upper and lower fan speed limits are less than the fan aerodynamic design speed, and the controller configured to provide a command to the actuator to adjust the flap from the first position to the second position corresponding to the target variable fan nozzle position, the target variable area fan nozzle position selected according to the schedule of curves.

14. The gas turbine engine according to claim 13, comprising:

a fan arranged in the fan nacelle;

a compressor section fluidly connected to the fan, the compressor comprising a high pressure compressor and a low pressure compressor;

a combustor fluidly connected to the compressor section;

a turbine section fluidly connected to the combustor, the turbine section comprising:

a high pressure turbine coupled to the high pressure compressor via a shaft; and a low pressure turbine.

15. The gas turbine engine according to claim 14, wherein the gas turbine engine includes a low Fan Pressure Ratio of less than about 1.45.

16. The gas turbine engine according to claim 13, wherein the controller is configured to provide the target variable area fan nozzle position for a range of air speeds based upon the fan speed, the air speed range is 0.35-0.55 Mach, and a data table includes the first and second thresholds corresponding to the lower and upper fan speed limits, the target variable area fan nozzle position selected based upon the first and second thresholds.

* * * * *